United States Patent Office 2,846,747
Patented Aug. 12, 1958

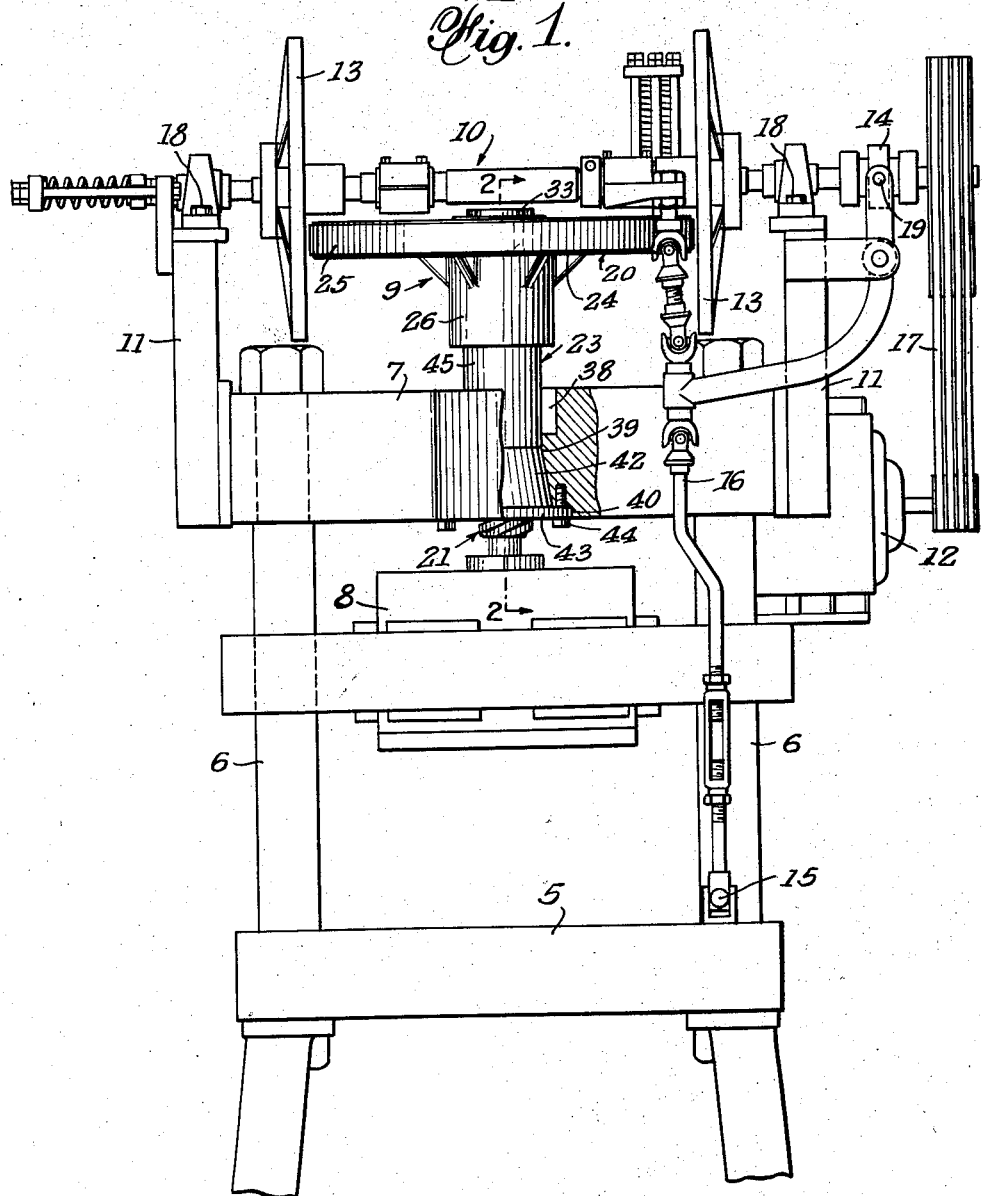

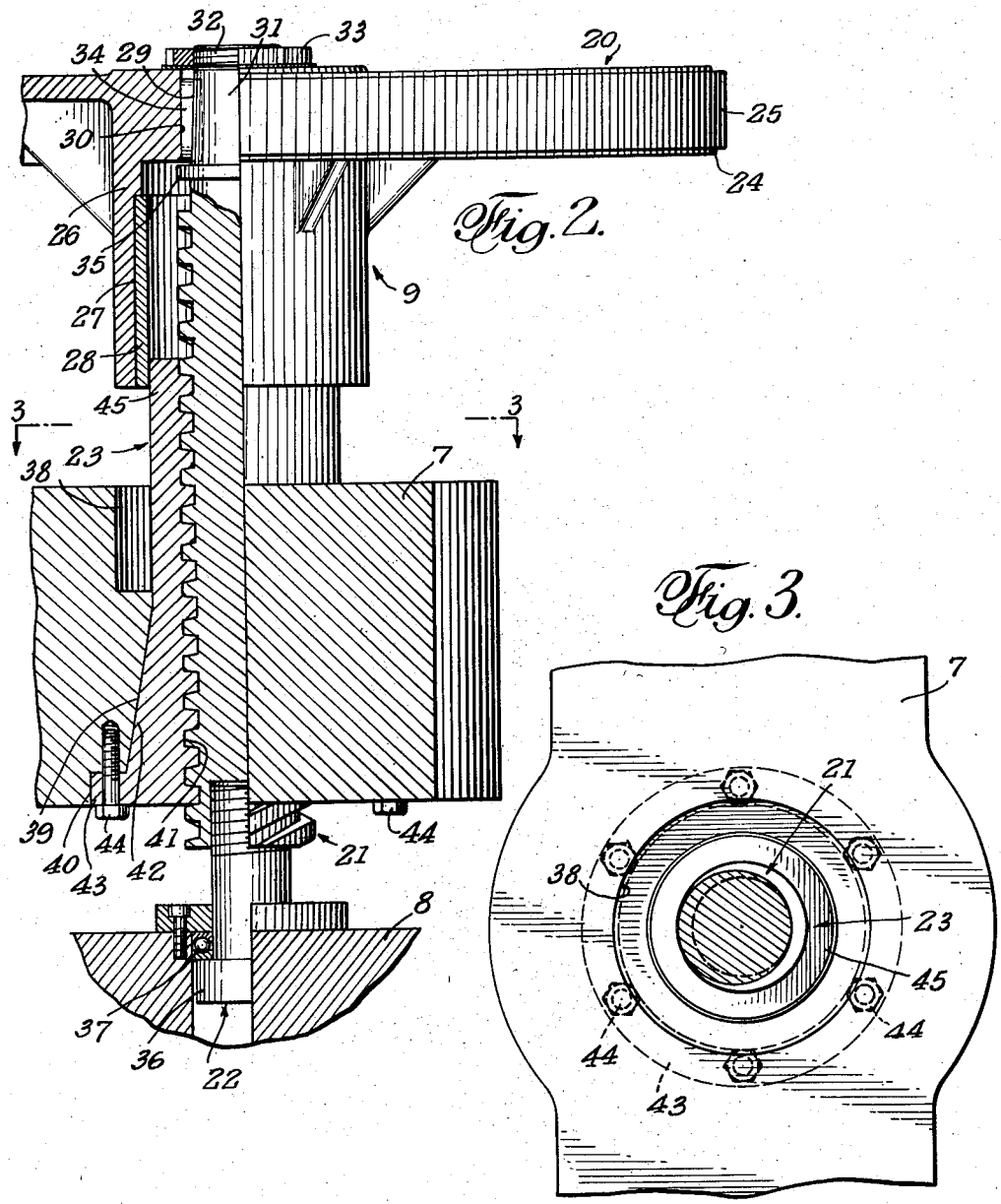

2,846,747

FRICTION PRESS

Norman B. Owen and Frank W. Owen,
Hermosa Beach, Calif.

Application November 7, 1955, Serial No. 545,165

3 Claims. (Cl. 25—45)

This invention relates to a friction press construction and deals more particularly with the type of such press that is used for molding ceramic tile and the like.

The usual friction press mounts a rigid yoke in which a wear-resistant nut is held as by a fit entailing great pressure. A lead screw is engaged in said nut and has a press fit connection with a bull wheel that is set in rotation, in one direction or the other, to raise and lower the lead screw. The power stroke of the press occurs on the down stroke of the screw, the up stroke being the return or recovery stroke.

Such presses for tile molding rate at a high capacity, eighty-five tons capacity being in common use. It will be realized that any parts that may be subject to all or part of such great force and have a tight fit in the part that carries the same will become so firmly "frozen" that removal is difficult at times when replacement, due to wear, becomes necessary. Present-day presses have such press-fitted parts and, when replacement of such parts becomes necessary, removal thereof can frequently be accomplished only by transporting the press components in question to a place or shop where an arbor press or similar powerful machine can be brought into use for such operation, which may entail force of fifty or more tons. The cumbersomeness of such manner of replacing worn parts need not further be discussed.

Since the travel of the lead screw in friction presses necessitates that said screw be substantially longer than the nut in which it operates, the screw has considerable free and unsupported extent above the nut when upwardly retracted. Since the downward projection of the screw results from a rotational force applied to the bull wheel by a friction disc and said disc incidentally producing a lateral force on the bull wheel, the screw is subjected to a bending moment each time that the same is projected.

In order to correct the above-mentioned faults in prior friction presses, it is an object of the present invention to provide a nut for the lead screw of the press that, while firmly held in non-displaceable position, cannot become frozen in place and can be readily removed for replacement by a hammer blow, and it is a further object of the invention to provide support for the screw to minimize any bend moment forces thereon.

A further object of the invention is to provide readily replaceable wear-taking means to hold the lead screw in non-deforming alignment, as above contemplated.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a front elevational view of a friction press of the type used in the ceramic industry, the same embodying the novel features of the present invention.

Fig. 2 is an enlarged cross-sectional view as taken on line 2—2 of Fig. 1, part of the means shown being in elevation.

Fig. 3 is a plan sectional view as taken on line 3—3 of Fig. 2.

The friction press that is illustrated in Fig. 1 comprises a bed 5 provided with upright supports 6 that mount a cross yoke 7. Between the bed and yoke and guided on supports 6, there is provided a platen 8 that is connected to and is movable toward and from the bed by means 9 carried by the yoke. A driving mechanism 10 is provided for operating the means 9, said mechanism being disposed in overstanding relationship to the means 9 and carried by brackets 11 affixed to the yoke 7. The mechanism 10 is powered by a motor 12 and includes a pair of opposed driving discs 13 that have alternate operative engagement with the means 9 according to the shifted position of clutch 14 as controlled by lever 15 through connections 16. Raising or lowering of platen 8 depends on which disc 13 is engaged with means 9.

It will be noted that the driving mechanism 10 may be removed as a unit by first removing drive belts 17 and then removing bolts 18 and the pin 19 that connects clutch 14 and connections 16. Removal of mechanism from support brackets 11 exposes the top of means 9 and gives access thereto for easy replacement of the worn parts thereof.

The means 9 comprises the novel elements of the present invention, the same comprising, generally, a bull wheel 20, a lead screw 21 extending downwardly from said wheel and having an operative connection 22 with the platen, and a nut 23 fixedly carried by the yoke 7 and in which the screw 20 is engaged.

The bull wheel is formed to constitute a force-inducing flywheel and comprises a flange 24 on the peripheral face of which is provided an endless band or belt 25 which is adapted to have suitable frictional drive engagement with the drive discs 13. Said wheel is formed with a hub 26 that is end-bored at 27, said bore being provided with a wear sleeve or bushing 28. While not shown, provisions may be made for supplying lubricant to the inner face of said bushing. Above bore 27, the wheel is provided with a concentric tapered hole 29, the flare of the taper being downward, as shown. A keyway 30 opens on said tapered hole.

The lead screw is preferably provided with a quick thread, the same being of the square or Acme type and usually triple. At its upper end, said screw is provided with a tapered end 31, designed to fit tapered hole 29, and with a threaded extension 32 for a lock nut 33. A key 34, in keyway 30, nonrotationally connects the bull wheel and lead screw, and nut 33 locks these two parts against endwise separation. A flange 35 where the taper 31 joins the lead screw limits the endwise engagement of wheel and screw.

It will be clear that the above-described connection between the bull wheel and the lead screw insures firm interconnection of these parts, although separation may be readily effected by removal of lock nut 33 and tapping either the wheel from the stem or the stem from its connection with the wheel. Once the fit at the taper is separated, the parts come apart easily.

At its lower end, the connection 22 of the lead screw is provided with a headed extension 36 that transmits the force of the bull wheel, while spinning, to the platen 8. A thrust bearing 37 is usually provided between the head of said extension and said platen to minimize friction during retractive movement of the lead screw.

So that the bull ring and the lead screw may have maximum travel, the upper face of the yoke 7 is provided with a bore 38 of a diametral size to receive the hub 26 of the bull wheel, the bore being sufficiently deep for the purpose. From substantially the bottom of the bore 38 to the under face of the yoke, the same is provided with a concentric tapered seat or bore 39 that diverges or flares in a downward direction. A shallow counterbore 40 is provided at the lower, larger end of the tapered bore 39.

The nut 23 has an internal thread 41 that is the mate for the thread of the lead screw and is provided with a conical body portion 42 on the same taper as bore 39 and fitting the same, accordingly. A flange 43 on the larger end of body portion 42 fits counterbore 40, and a set of suitable screws or bolts 44 fasten the nut to the yoke and are so applied as to draw the nut firmly into the tapered seat.

The nut is provided with an upper cylindrical extension 45 that extends substantially above the upper face of the yoke 7 and has a running fit in bushing 28. In the upper position of the screw, the nut extends but a short distance into engagement with said bushing, there being a telescopic movement of the nut and bushing as the latter moves downward with the bull wheel. Thus, the lead screw is not only held against bending by the lead screw extension 45, but the bull wheel is also guided during movement by said extension to obviate wobble thereof.

It will be clear that, after removal of the screw 21 from the nut 23, and extraction of the screws 44, all that is needed for effecting removal of the nut is to strike the extending end 45 in a direction to break the fit at the taper 39.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described our invention, what we claim and desire to secure by Letters Patent is:

1. In a friction press having a yoke provided with a tapered seat diverging in a downward direction, a nut having a tapered body engaged in said seat, a bull wheel, a lead screw on which the bull wheel is mounted and engaged with the threads of said nut and carrying a member adapted to create a thrust force in a direction to press the nut body into the seat, the nut being provided with a portion extending beyond the yoke, and the bull wheel being formed to have a bushing-provided hub in running fit engagement around the extending portion.

2. In a friction press having a yoke provided with a tapered seat diverging in a downward direction, a nut having a tapered body engaged in said seat, means to draw and hold the body firmly in said seat, said nut being provided with an upper extension above the yoke, the nut and its extension being internally threaded throughout its length, a screw engaged in the nut, a bull wheel carried by the screw, the bull wheel being provided with a hollow hub and said hub being provided with a bushing in running fit with said nut extension.

3. In a friction press having a yoke provided with a tapered seat diverging in a downward direction, a nut having a tapered body engaged in said seat, means to draw and hold the body firmly in said seat, said nut being provided with an upper extension above the yoke, the nut and its extension being internally threaded throughout its length, a screw engaged in the nut, a bull wheel carried by the screw, the bull wheel being provided with a hollow hub having a running fit with said nut extension, the hollow of said hub being lined with a wear bushing, and the bushed end of the hub being adapted to enter a bore provided therefor in the top of the yoke.

References Cited in the file of this patent

UNITED STATES PATENTS

| | | |
|---|---|---|
| 1,440,303 | Landback | Dec. 26, 1922 |
| 1,553,243 | Ivens | Sept. 8, 1925 |
| 1,646,846 | Yingling | Oct. 25, 1927 |
| 1,456,752 | Zeh | May 29, 1933 |